United States Patent [19]

Kokko

[11] 4,015,761

[45] Apr. 5, 1977

[54] SPARE TIRE LOCKING MECHANISM

[76] Inventor: Gerald Kokko, 21051 Delaware, Southfield, Mich. 48075

[22] Filed: Aug. 16, 1973

[21] Appl. No.: 389,019

[52] U.S. Cl. .................. 224/42.24; 24/201 A; 248/503

[51] Int. Cl.² ......................... B62D 43/10

[58] Field of Search ......... 224/42.24, 42.25, 42.12, 224/42.13, 42.4; 24/201 A; 253/113; 292/256.5, 97, DIG. 11, DIG. 49; 248/503, 500, 119 R; 85/3, 66

[56] References Cited

UNITED STATES PATENTS

| 2,635,795 | 4/1953 | White | 224/42.24 X |
| 2,674,394 | 4/1954 | Hall et al. | 224/42.24 |
| 2,797,036 | 6/1957 | Geiger | 224/42.24 |
| 2,931,549 | 4/1960 | Adkins | 224/42.24 |

Primary Examiner—Robert J. Spar
Assistant Examiner—Jerold M. Forsberg

[57] ABSTRACT

A device and a method for securing a spare tire and wheel to a vehicle comprising of an elongated rod having a linked toggle mechanism. A hook at one end of the rod is insertable through a central aperture of the wheel, for attachment to a mounting device carried by the vehicle, while the other end of the elongated rod is threaded into the base of the toggle mechanism. When the toggle mechanism is closed, it overlaps the edge of the hub of the wheel and holds the wheel securely in place. When the toggle mechanism is opened, it does not overlap the edge of the wheel hub and the wheel may be easily removed from the mounting device.

2 Claims, 4 Drawing Figures

SPARE TIRE LOCKING MECHANISM

FIELD OF THE INVENTION

The present invention relates to a device for securing the spare tire and wheel within the trunk of an automobile.

DESCRIPTION OF THE PRIOR ART

Heretofore, automobile spare tires have been secured in or onto an automobile by a variety of devices. Unfortunately all of these devices and methods for securing tires and wheels are either outdated or have proved to be inconvenient and cumbersome. Some of the prior art in this field is discussed hereinafter.

The Steel et al U.S. Pat. No. 1,327,742 issued in 1920 discloses a mechanism for holding a wheel on an automobile where a toggle linkage is used to spread holding members which grip against the inside of the wheel. In contrast to the present invention, the Steel invention contemplates a device adapted to be secured at the rear end or the side of an automobile for carrying one or more extra demountable rims or tires, and requires that the tire be carried on a ring forming a continuous seat for the tire. There is no disclosure in the Steel Patent of the provision of a link toggle mechanism adjacent one major surface of the wheel, and the hook portion of an elongated member for connecting the wheel to an external surface near the opposite major surface of the tire or wheel.

The Hoover U.S. Pat. No. 1,337,911 issued in 1920 discloses a tire carrier including a spring-supported clamping member which may be instantly released to remove a tire and which will positively prevent rattles when the tires are locked. Hoover utilizes a pair of tire-engaging elements, a leaf spring element adjustably mounted between the pair of tire-engaging elements, and a tire-engaging member movably connected to the spring element so as to be tensioned thereby. In contrast to the present invention, Hoover does not disclose an elongated threaded part having a hook on one end, and a link toggle mechanism on the other end.

The Green U.S. Pat. No. 1,567,366 issued in 1925 discloses a tire carrier attachment for the running board of a vehicle, wherein the tire is held between a movable tire shoe and a U-shaped support. Here again, there is no disclosure of a toggle mechanism attached to an elongated threaded member.

The Lynn U.S. Pat. No. 1,629,039 issued in 1927 discloses a segmental hoop type of tire carrier for use on the running board of a vehicle. The Lynn patent lacks the features of the present invention.

The Murphy U.S. Pat. No. 1,718,828 issued in 1929 discloses a display device, for mounting a pile of automobile tires, which prevents unauthorized removal of the tires from the device. The Murphy patent is somewhat pertinent for its disclosure of a handle 13 affixed to a member 12 which is used to actuate a toggle mechanism to expand outwardly to grasp the inner portion of a pile of tires. In contrast to the present invention, Murphy does not disclose an elongated threaded member terminating in a hook portion affixed to an external surface, and Murphy also does not contemplate the toggle mechanism itself bearing against the inner hub portion of a wheel.

The Hall and White U.S. Pat. No. 2,674,394 issued in 1951 discloses a clamp for holding spare tires and wheels, and is somewhat pertinent for its disclosure of the embodiment in FIGS. 3 and 4 thereof. This patent comtemplates adjusting the clamping pressure by rotating the clamp and threaded stud to advance the pivot pin 37 toward or away from the car frame member 39 to adjust the tightness of the clamp. Although this patent discloses a clamp link mechanism affixed to an elongated threaded member, the patent fails to disclose a toggle link mechanism whose pivot point can be translated relative to an elongated threaded member, which elongated threaded member is not threaddedly or permanently secured to any car frame member. Moreover, the patent fails to disclose a quadrilateral-type toggle mechanism which positively engages the car wheel hub at opposite locations thereof.

The Merbler U.S. Pat. No. 3,081,924 issued in 1963 discloses a spare wheel locking device wherein bolt 24 is pivotally attached to the car frame member and passes through the central opening in a spare tire wheel to connect with a special locking device. The special locking device is not an expansible quadrilateral-type link locking mechanism which can be easily opened by pulling a nylon pull rope, but rather it is a fulcrumed locking device 36.

SUMMARY OF THE INVENTION

The present invention provides an apparatus for selectively retaining an object, having at least one aperture therethrough, relative to a mounting device, comprising, in combination, two means, the first of which is adapted to be inserted through an aperture in the object and secured at one end to a mounting device. The second means is adapted to be connected to the other end of the first means and is capable of changing its profile relative to the aperture in the object so that the profile has at least one dimension greater than the largest cross-sectional dimension of the aperture when the object is to be selectively retained, and so that another profile has all of its dimensions less than the smallest cross-sectional dimension of the aperture when the object is to be moved relative to the first means.

The object of this invention is to provide a device which when in use will hold the spare tire and wheel securely in place but which can be quickly and easily disengaged without the use of additional tools.

Other objects, advantages, and applications of the present invention will become apparent to those skilled in the art of tire securing devices when the accompanying description of one example of the best mode contemplated for protecting the invention is read in conjunction with the accompanying drawings.

BRIEF DESCRIPTION OF THE DRAWINGS

The description herein makes reference to the accompanying drawings wherein like reference numerals refer to like components throughout the several views and in which.

DESCRIPTION OF A PREFERRED EMBODIMENT

Figure 1:
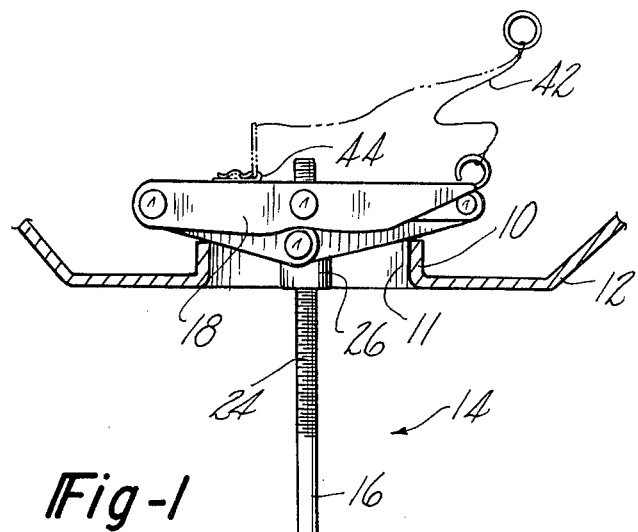
FIG. 1 is a side view of the preferred embodiment of the present invention shown in the closed position securing the hub of a wheel, only a fragment of the wheel being shown.
Figure 2:
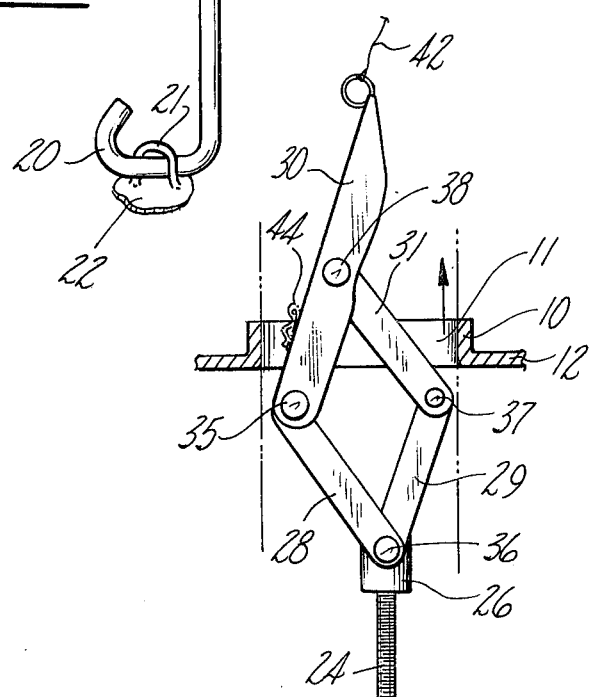
FIG. 2 is a side view of the preferred embodiment of the present invention shown in the open position.
Figure 3:
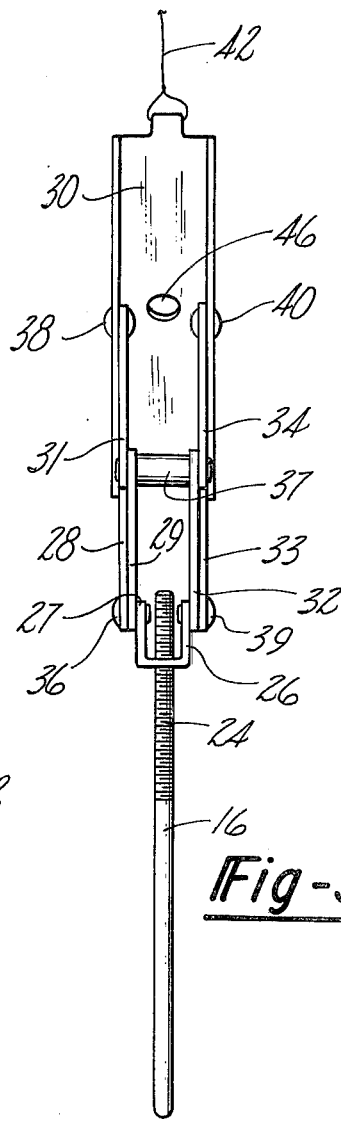
FIG. 3 is an end view of FIG. 2.

Referring to the drawings and, in particular, to FIG. 1, wherein there is shown a portion of a hub 10 of a spare tire wheel 12 which is adapted to be secured to a vehicle by means of a locking mechanism 14 comprising of an elongated rod 16 and a quadrilateral-type linked toggle mechanism 18. One end of the elongated rod 16 is shaped in the form of a hook 20, and can be connected, through a central aperture 11 in the spare tire wheel 12, to a U-bolt 21 secured to a mounting device 22 located on the frame of the vehicle. The other end 24 of the elongated rod 16 is adjustably and selectively attached to a base 26 of the toggle mechanism 18 by a threaded connection. In FIGS. 2 and 3 there are shown the arms 28, 29, 30, 31, 32, 33 and 34 of the quadrilateral-type toggle mechanism 18 interconnected by a series of pivot pins 35, 36, 37, 38, 39 and 40.

A nylon cord 42 is attached to toggle arm 30 and is used to pull the toggle mechanism open. When not is use the nylon cord 42 is attached to safety catch 44. In FIG. 3, the U-shaped toggle mechanism base 26 is shown with the elongated rod 16 threaded into it. The aperture 46 in toggle arm 30 permits closure of the toggle mechanism even when the elongated rod 16 is threaded into the base 26 so that the end 24 of the elongated rod is beyond the top 27 of the base 26 of the toggle mechanism 18.

When the linked toggle mechanism 18 is closed, as shown in FIG. 1, it has a profile with a dimension which is greater than the cross-sectional dimension of the central aperture 11 in the hub 10 of the spare tire wheel 12. In this position, the arms of the toggle mechanism 18 overlap the hub 10 of the wheel 12 and prevent the wheel 12 from being moved away from the mounting device 22. If it is found that a greater or lesser tension on the wheel 12 is required to securely hold the wheel 12 is place, the closed overlapping toggle mechanism 18 can be translated relative to the elongated rod 16 to a position closer or further from the mounting device 22 by rotating the toggle mechanism 18 clockwise or counter-clockwise.

To open the toggle mechanism 18, the nylon cord 42 is pulled upward. As shown in FIG. 2, this forces the arms of the toggle mechanism 18 to pivot on the corresponding pivot pins and changes the profile of the toggle mechanism 18 relative to the central aperture 11 in the spare tire wheel 12. The resultant profile of the open toggle mechanism has a dimension which is less than the cross-sectional dimension of the central aperture 11. When the toggle mechanism is open, none of the arms of the toggle mechanism 18 overlap the hub 10 and the spare tire wheel 12 can easily be moved away from the mounting device 22.

Figure 4:
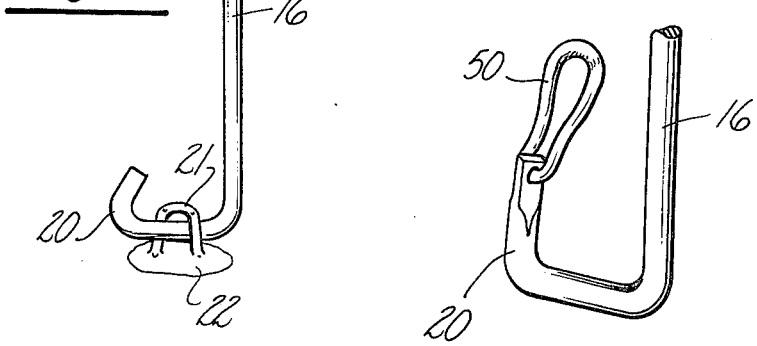
FIG. 4 is another embodiment of the invention in the form of an enlarged view of a hook on the end of an elongated rod.

In FIG. 4 an enlarged view of the hooked end 20 of the elongated rod 16 is shown with a modified snapping retainer 50 attached thereto.

In use, the toggle mechanism functions in the following manner. The spare tire wheel 12 is positioned over the mounting device 22 such that the toggle mechanism 18 is disposed in the center of aperture 11. Toggle arm 30 is then rotated in a clockwise fashion causing pivot pins 35 and 37 to diverge and toggle arms 28 and 29 to oppositely rotate about their common pivot pin 36. The longitudinal edges of toggle arms 28 and 29 abut the top edge of aperture 11 before the toggle mechanism is in a fully closed position. Continued clockwise rotation of toggle arm 30 causes arms 28 and 29 to exert a downward force on the spare tire wheel 12 thereby drawing the wheel securely against the mounting device. In its fully closed position (FIG. 1), pivot pins 35, 37 and 38 are in a substantially colinear relationship such that the absence of a vertical reaction force acting on pivot pin 38 in addition to joint friction forces causes the toggle mechanism to lockingly maintain downward force on the spare tire wheel.

I claim:

1. An apparatus for selectively retaining an object relative to a mounting device, comprising, in combination:

an object having at least one aperture therethrough;

first means being adapted to be inserted through said aperture in said object and being adapted to be secured at one end thereof to said mounting device;

second means being adapted to be connected on said first means for selectively retaining said object in a predetermined position relative to said mounting device; and said second means being capable of changing its profile relative to said aperture in said object so that said profile has at least one dimension greater than the largest cross-sectional dimension of said aperture when said object is to be retained in said predetermined position, and so that said profile has all of its dimensions less than the smallest cross-sectional dimension of said aperture when said object is to be moved relative to said first means, and wherein said second means is a quadrilateral-type toggle mechanism capable of changing its dimension relative to the cross-sectional dimension of the aperture in said object so that said toggle mechanism is capable of forming at least two positions, one of which at least two arms of said toggle mechanism overlap the edge of said object and the other of which none of the arms of said toggle mechanism overlap the edge of said object.

2. An apparatus according to claim 1, wherein:

said object is a spare tire and wheel for a vehicle;

said first means is an elongated rod insertable through an aperture in said object and capable of being attached to a mounting device by a hook at one end, the other end of said rod being threaded into said second means;

said second means is a quadrilateral-type toggle mechanism comprised of a plurality of interconnected arms capable of being moved with respect to each other enabling said second means to change its profile relative to the aperture in said object so that said profile has at least one dimension greater than the largest cross-sectional dimension of said aperture when said object is to be retained in said predetermined position, and so that said profile has all of its dimensions less than the smallest cross-sectional dimension of said aperture when said object is to be moved relative to said first means.

* * * * *